US008923453B2

(12) United States Patent
Schlegel et al.

(10) Patent No.: US 8,923,453 B2
(45) Date of Patent: Dec. 30, 2014

(54) SYSTEM AND METHOD FOR ITERATION SCHEDULING IN JOINT EQUALIZATION AND TURBO DECODING

(75) Inventors: Christian Schlegel, Park City, UT (US); Yajun Kou, San Diego, CA (US); Tao Wu, Carlsbad, CA (US); Young Hoon Kwon, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 566 days.

(21) Appl. No.: 12/870,338

(22) Filed: Aug. 27, 2010

(65) Prior Publication Data

US 2012/0051470 A1   Mar. 1, 2012

(51) Int. Cl.
  *H04B 1/10* (2006.01)
  *H04L 25/03* (2006.01)
  *H04J 11/00* (2006.01)
  *H04L 1/00* (2006.01)

(52) U.S. Cl.
  CPC ....... *H04L 25/03171* (2013.01); *H04J 11/0036* (2013.01); *H04L 1/0048* (2013.01); *H04L 1/005* (2013.01); *H04L 25/0328* (2013.01)
  USPC ....................................... 375/346

(58) Field of Classification Search
  CPC ............. G06F 7/50; H04B 1/10; H04L 27/00; H04L 27/01; H04L 27/06; H04L 29/02; H03M 13/00; H03M 13/03; H03M 13/05
  USPC .......... 370/320, 328, 329, 345, 465; 375/229, 375/267, 295, 329, 340, 341, 346; 455/101; 714/748, 752, 776, 786
  See application file for complete search history.

(56) References Cited

U.S. PATENT DOCUMENTS

| | | | | |
|---|---|---|---|---|
| 8,532,229 | B2 * | 9/2013 | Dowling et al. | 375/340 |
| 2003/0018942 | A1 * | 1/2003 | Seo | 714/786 |
| 2003/0212948 | A1 * | 11/2003 | Eroz et al. | 714/789 |
| 2004/0151259 | A1 * | 8/2004 | Berens et al. | 375/340 |
| 2005/0278603 | A1 * | 12/2005 | Berens et al. | 714/755 |
| 2008/0025427 | A1 * | 1/2008 | Lee et al. | 375/262 |
| 2008/0025429 | A1 * | 1/2008 | Lee et al. | 375/267 |
| 2008/0168332 | A1 * | 7/2008 | Palanki et al. | 714/776 |

OTHER PUBLICATIONS

Berrou, C., et al., "Near Shannon Limit Error—Correcting Coding and Decoding: Turbo-Codes (1)," IEEE 1993, pp. 1064-1070.
Gallager, R.G., "Low-Density Parity-Check Codes," Ire Transactions on Information Theory, Jan. 1962, pp. 21-28.
Schlegel, C., et al., "Coordinated Multiuser Communications," Jun. 1, 2005, 286 pages, Springer.
Shi, Z., et al., "Joint Iterative Decoding of Serially Concatenated Error Control Coded CDMA," IEEE Journal on Selected Areas in Communications, vol. 19, No. 8, Aug. 2001, pp. 1646-1653.

\* cited by examiner

*Primary Examiner* — Jaison Joseph
*Assistant Examiner* — Shawkat M Ali
(74) *Attorney, Agent, or Firm* — Slater & Matsil, L.L.P.

(57) ABSTRACT

A system and method for iteration scheduling in joint equalization and turbo decoding are provided. A method for processing received information includes cancelling interference in a received signal bearing received information, decoding the interference cancelled received signal to produce information, and processing the received information. The cancelling comprises an iterative processing of the received signal based on soft information produced by a decoding the received signal.

21 Claims, 5 Drawing Sheets

SYSTEM AND METHOD FOR ITERATION SCHEDULING IN JOINT EQUALIZATION AND TURBO DECODING

TECHNICAL FIELD

The present invention relates generally to a system and method for wireless communications, and more particularly to a system and method for iteration scheduling in joint equalization and turbo decoding.

BACKGROUND

Turbo codes and low density parity-check (LDPC) codes have been introduced into a number of recent digital communications standards, including the Third Generation Partnership Project (3GPP) Long Term Evolution (LTE) technical standards, which may be relevant for a fourth-generation long-term evolution roadmap. Specifically, the 3GPP LTE technical standards specify a rate $R=\frac{1}{3}$ turbo code using two eight-state constituent component codes.

Following the success of turbo codes, iterative information processing has subsequently been applied to interference cancellation, multiple access joint decoding, and so forth. Usually, in such communications systems, soft information produced by an error control decoder may be used to partially cancel interference created by multiple access and permit a new decoding step with improved performance. Under certain conditions, the iterative exchange of soft information between the error cancellation device and the soft-output error control decoder leads to convergence where the interference may be completely removed.

Generally, it is observed that powerful error control codes that perform well on their own in additive Gaussian channels do not work well in an iterative interference cancellation environment, while weaker error control codes may operate successfully at much higher levels of interference. However, the weaker codes are often unable to achieve the low error rates required by system specifications. The inability to achieve desired low error rates has hindered the widespread application of iterative cancellation methods.

SUMMARY OF THE INVENTION

These and other problems are generally solved or circumvented, and technical advantages are generally achieved, by preferred embodiments of the present invention which provide a system and method for iteration scheduling in joint equalization and turbo decoding.

In accordance with a preferred embodiment of the present invention, a method for processing received information is provided. The method includes cancelling interference in a received signal bearing received information, decoding the interference cancelled received signal to produce information, and processing the received information. The cancelling includes an iterative processing of the received signal based on soft information produced by a decoding of the received signal.

In accordance with another preferred embodiment of the present invention, a method for processing received information is provided. The method operating in a first phase, operating in a second phase, and processing the received signal. The first phase includes a cancellation of interference in a received signal bearing the received information, and the cancellation of interference is performed iteratively and is based on estimates of the received signal using a first decoding, thereby producing an interference cancelled received signal. The second phase includes extracting the received information from the interference cancelled received signal using a second decoding technique, and the second decoding technique is different from the first decoding technique, or is an extension of the first decoding technique.

In accordance with another preferred embodiment of the present invention, a receiver is provided. The receiver includes an interference cancellation unit, a de-interleaver coupled to the interference cancellation unit, a decoder coupled to the de-interleaver, a re-interleaver coupled to the decoder, and a soft symbols generate unit coupled to the re-interleaver. The interference cancellation unit is coupled to an input port and iteratively reduces interference in a received signal provided by the input port based on estimates of information in the received signal. The de-interleaver removes an interleaving of information contained in the received signal, the decoder decodes the received signal, where the received signal is decoded using a technique selected based on an operating phase of the receiver. The re-interleaver re-interleaves the information contained in an estimate of the information in the received signal produced by the decoder, and the soft symbols generate unit generates the estimates of information in the received signal.

An advantage of an embodiment is that the use of soft symbols in interference cancellation in a first stage of an interference cancellation iteration may allow for a faster convergence, while the use of turbo decoding in a second stage may yield better decoding performance.

A further advantage of an embodiment is that the multistage operation in an interference cancellation iteration may reduce an overall level of computational resources required to provide a desired error rate.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a 3GPP LTE compliant communications system. The invention may also be applied, however, to other communications systems, such as those that are compliant to 3GPP LTE-Advanced, WiMAX, and so forth, technical standards.

Figure 1:
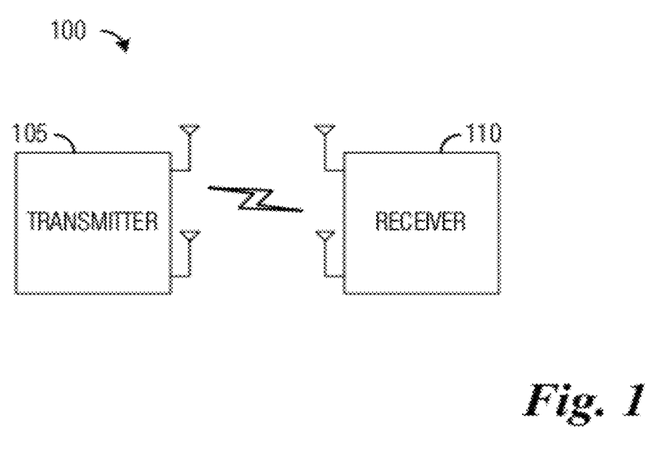
FIG. 1 is a diagram of a communications system.

FIG. 1 illustrates a communications system 100. Communications system 100 includes a transmitter 105 and a receiver 110. As shown in FIG. 1, both transmitter 105 and receiver 110 include multiple antennas (multiple transmit and/or receive antennas) and therefore may be capable of operating in multiple-input, multiple-output (MIMO) mode.

Although not shown, electronic devices may be coupled to transmitter 105 and/or receiver 110. Examples of electronic devices may include a computer, personal digital assistant, media server, media player, or so forth, may be coupled to transmitter 105 and/or receiver 110 to be able to communicate with other electronic devices. Alternatively, transmitter 105 and/or receiver 110 may be integrated into electronic devices. Generally, an electronic device will include both a transmitter and a receiver to enable two-way communications.

Receiver 110 may include multiple signal chains, one for each receive antenna. Discussion of receiver 110 herein focuses on a single signal chain. However, other signal chains of receiver 110 may be substantially similar. Therefore, the discussion of a single signal chain should not be construed as being limiting to either the scope or spirit of the embodiments. Furthermore, in the interest of clarity, only components of receiver 110 relevant to the embodiments will be discussed herein. It should be understood that receiver 110 includes a number of components that may be required for operation but are not discussed. These components may include memories, amplifiers, filters, analog-to-digital converters, digital-to-analog converters, and so forth.

In general, receiver 110 may take signals received at its received antennas and decode the received signals to produce information that may be used by applications to control the operation of receiver 110 or device coupled to receiver 110, stored for subsequent use, provided to a user of the device coupled to receiver 110 (e.g., music, videos, photos, text, data, applications, etc.), transmitting to another device, or so forth. The accuracy of the information produced by receiver 110 as compared to information contained in the signals as transmitted by transmitter 105 may be a function of the quality of the channel, the strength of a code (if any) used to encode the information transmitted by transmitter 105, and so forth.

Typically, strong error control codes may help to ensure that the information produced by receiver 110 accurately matches with the information contained in the signals transmitted by transmitter 105. However, strong codes may reduce the amount of information that may be transmitted at any one time. Additionally, stronger codes normally require a greater amount of processing of the signals.

Figure 2:
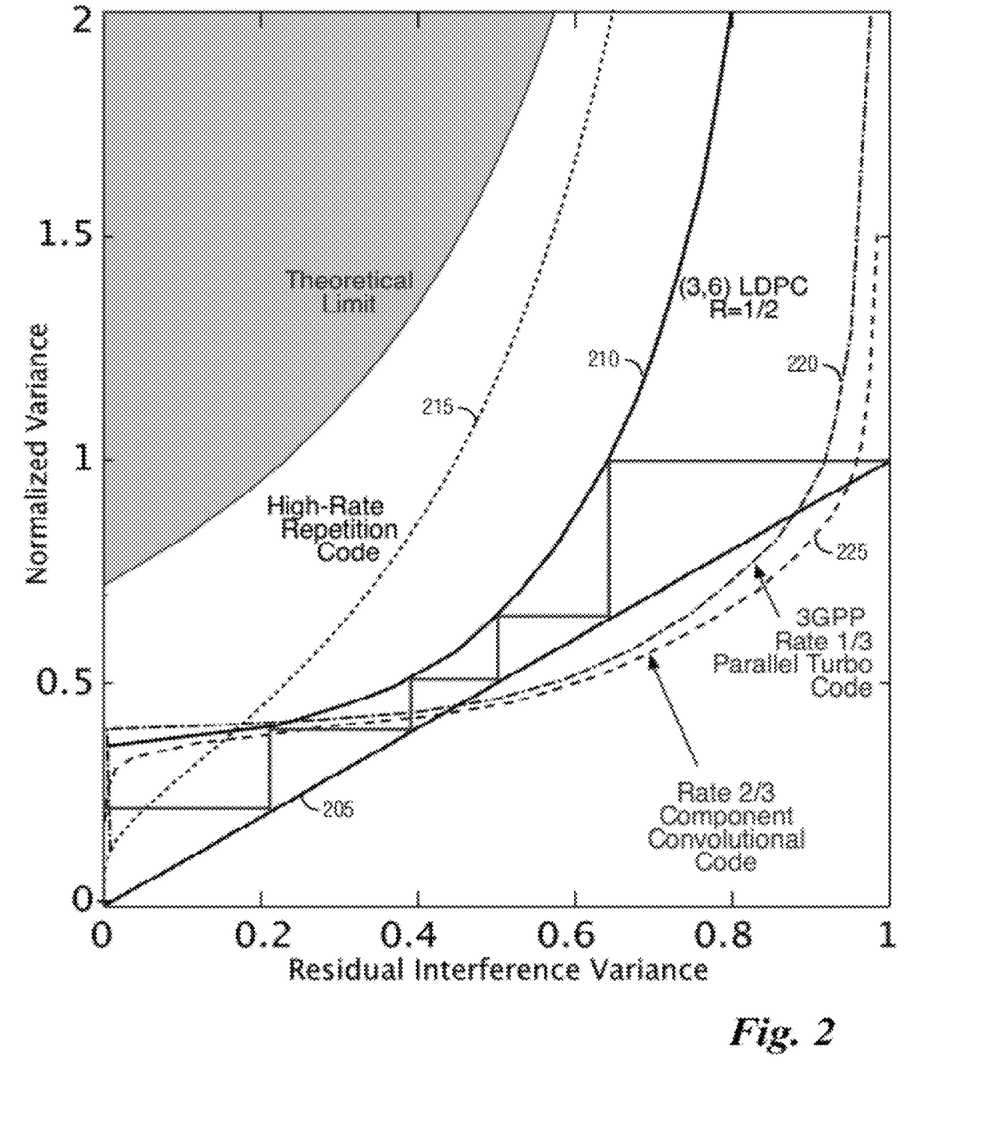
FIG. 2 is a plot of variance transfer curves for interference cancellation techniques.

FIG. 2 illustrates a plot of a variance transfer curve for interference cancellation techniques utilizing error control codes. A first curve (cancellation curve) 205 represents a variance transfer curve for a simple canceller that is proportional to communications system load. A second curve (code curve) 210 represents a variance transfer curve for a convolutional code, a third code curve 215 represents the variance transfer function for a high-rate repetition code, a forth code curve 220 represents a variance transfer curve for a 3GPP rate ⅓ parallel turbo code, and a fifth code curve 225 represents a variance transfer curve for a rate ⅔ component convolutional code.

In general, the steeper the cancellation curve, the larger the multiple access interference. A communications system that may be capable of supporting a steeper curve may support a larger amount of multiple access interference, and is therefore preferable. As shown in FIG. 2, the convolutional code (second code curve 210) may support more than twice the interference load (its curve has a slope that is more than twice as large as that for the high-rate repetition code (third code curve 215). The curves show that a strong code may be a poor choice if used in a receiver with iterative equalization such as discussed below.

Figure 3:
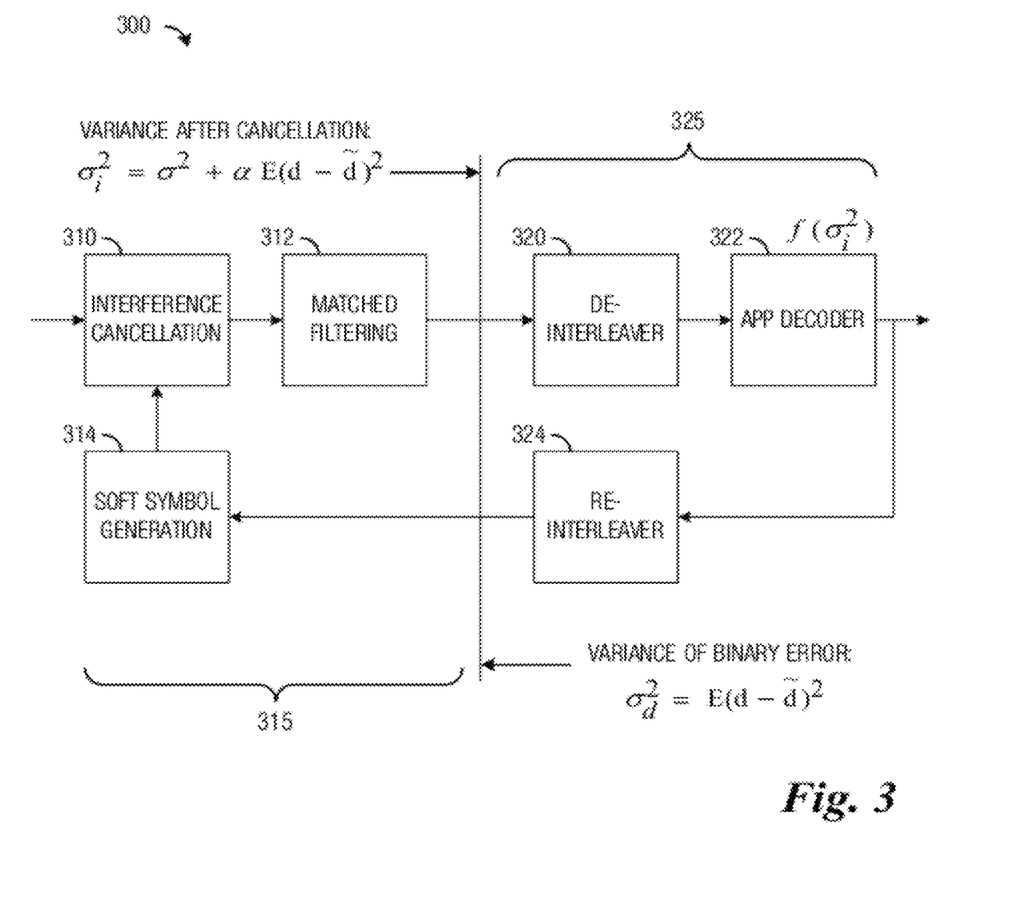
FIG. 3 is a diagram of a detailed view of a receiver, where receiver makes use of iterative equalization.

FIG. 3 illustrates a detailed view of a receiver 300, where receiver makes use of iterative equalization. Receiver 300 includes an interference cancellation unit 310, a matched filtering unit 312, and a soft symbol generation unit 314 that may be used in interference cancellation (shown collectively as interference canceller 315). Receiver 300 also includes a de-interleaver 320, an a posteriori probability (APP) decoder unit 322 and a re-interleaver unit 324 that may be used in decoding (shown collectively as decoder 325). Matched filter unit 312 may be substituted with other linear filters, such as a minimum mean-square error filter, a multi-stage filter, or so on, which may accelerate convergence.

Interference canceller 315 may be used to remove interference arising from the use of multiple access techniques and may reduce or eliminate interference present in a signal by subtracting interference detected in previously processed signals. Decoder 325 may utilize the error correcting capabilities of the error detecting and correcting code to correct at least some of the errors present in the information bearing signal due to transmission.

As shown in FIG. 3, interference canceller 315 includes interference cancellation unit 310, matched filtering unit 312 coupled to interference cancellation unit 310, and soft symbol generation unit 314 coupled to interference cancellation unit 310 and to decoder 325. According to an embodiment, interference cancellation unit 310 may reduce or eliminate interference present in the information bearing signal by subtracting an estimate of the interference present in the information bearing signal from the information bearing signal itself. The estimate of the interference may be computed from previously received signals. For iterative processing, interference cancellation unit 310 may make use of soft information, e.g., soft symbols, to reduce or eliminate the interference in the information bearing signal. Soft information may be a representation of likelihoods of information contained in the information bearing signal. For example, a soft symbol may be a likelihood that a symbol in the information bearing signal is a certain symbol value.

Matched filtering unit 312 may be used to correlate a known signal (e.g., a previously received information bearing signal) with an unknown signal (e.g., the information bearing signal) to obtain a correlation of the known signal with the unknown signal. Matched filtering unit 312 may be used to maximize a signal to noise ratio in the presence of interference. Alternately, a minimum mean-square error filter may be used instead of matched filtering unit 312 to maximize a signal to noise ratio further utilizing information about the interfering signal.

Soft symbol generation unit 314 may be used to generate the soft information, e.g., soft symbols, used by interference cancellation unit 310 to reduce or eliminate interference from the information bearing signal. Soft symbol generation unit 314 may make independent use of soft information derived from the component codes and component decoders used in decoder 325. The use of certain component codes and corresponding decoders in decoder 325 may improve decoding and interference cancellation convergence as well as allow for higher system loads in terms of users, data rates, parallel channels, and so on. A typical implementation may use convolutional component codes arranged in either parallel or serial concatenation, also known as convolutional turbo codes.

Interference cancellation unit 310, matched filtering unit 312, and/or soft symbol generation unit 314 may be implemented as custom designed integrated circuits, e.g., application specific integrated circuits, which are especially designed to implement the operations performed by the various units. As an example, field programmable gate arrays may be used to implement any or all units in interference canceller 315. Alternatively, interference cancellation unit 310, matched filtering unit 312, and/or soft symbol generation unit 314 may be implemented as software or firmware routines executing on a microprocessor, a digital signal processor, a general purpose processor, and so forth.

As shown in FIG. 3, decoder 325 includes de-interleaver unit 320, an APP decoder unit 322 coupled to de-interleaver unit 320, and re-interleaver unit 324 coupled to APP decoder unit 322 and interference canceller 315 (soft symbol generation unit 314). De-interleaver unit 320 may be used to reverse an interleaving of bits in the information bearing signal introduced by transmitter 100, which may be used to help reduce the impact of errors on adjacent bits. De-interleaver unit 320 may be implemented as a configurable switch, such as a cross-bar switch.

APP decoder unit 322 may be used to implement convolutional decoding, turbo decoding using convolutional codes, a combination thereof, or any other combination of soft-output component decoders. APP decoder unit 322 may be controlled by a control signal that may be used to select the type of decoding APP decoder unit 322 uses to decode the information bearing signal. If APP decoder unit 322 is selected to use convolutional decoding, the output of APP decoder unit 322 may be re-interleaved in re-interleaver unit 324 and provided to soft symbol generation unit 314 of interference canceller 315 for use in an iterative fashion to generate soft information, such as soft symbols, for use in reducing or eliminating interference in the information bearing signal. According to an embodiment, re-interleaver unit 324 may make use of an interleaving pattern consistent with the interleaving of the bits in the information bearing signal introduced by transmitter 100. In other words, re-interleaver unit 324 may be identical (or substantially identical) to an interleaver in transmitter 100. If APP decoder unit 322 is selected to use turbo decoding, output of APP decoder unit 322 may be estimates of the information bearing signal as derived by the full turbo decoder. A detailed description of APP decoder unit 322 is provided below.

A variance behavior for APP decoder unit 322 may be expressed as $f(\sigma_i^2)$, where $f(\ )$ represents a function, and i is an iteration index, a count of a number iterations through interference canceller 315 and decoder 325. A variance of binary error of the output of re-interleaver unit 324 may be expressed as $\sigma_d^2 = E(d-\tilde{d})^2$, where $E(\ )$ is the expected value function, d is the information bearing signal, and $\tilde{d}$ is the soft estimate of the information bearing signal as derived from the output of the APP decoder Finally, the variance of the output of interference canceller 310 may be expressed as $\sigma_i^2 = \sigma^2 + \alpha E(d-\tilde{d})^2$, where $\alpha$ is a coefficient related to the level of mutual interference present in the received signal.

De-interleaver unit 320, App decoder unit 322, and/or re-interleaver unit 324 may be implemented as custom designed integrated circuits, e.g., application specific integrated circuits, which are especially designed to implement the operations performed by the various units. As an example, field programmable gate arrays may be used to implement any or all units in decoder 325. Alternatively, de-interleaver unit 320, App decoder unit 322, and/or re-interleaver unit 324 may be implemented as software or firmware routines executing on a microprocessor, a digital signal processor, a general purpose processor, and so forth.

Figure 4A:
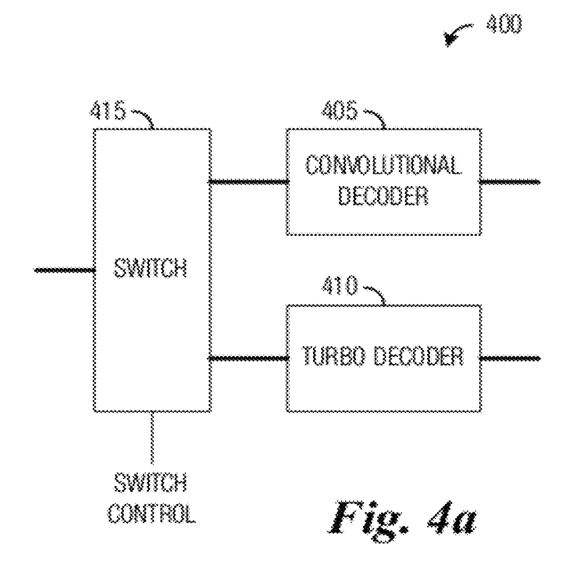
FIG. 4a is a diagram of a detailed view of a first APP decoder unit.

FIG. 4a illustrates a detailed view of a first APP decoder unit 400. First APP decoder unit 400 may be an implementation of APP decoder 322 of FIG. 3. As discussed previously, first APP decoder unit 400 may be capable of operating as a soft-output convolutional decoder, a turbo decoder, a partial soft-output convolutional or turbo decoder, or a combination thereof.

In order to operate as either a convolutional decoder or a turbo decoder, first APP decoder unit 400 includes both a convolutional decoder 405 and a turbo decoder 410. According to an embodiment, convolutional decoder 405 and turbo decoder 410 both include appropriate decoders of desired type.

A switch 415 coupled to convolutional decoder 405 and turbo decoder 410 may couple an input port to either convolutional decoder 405 or turbo decoder 410 based on a value of a switch control signal coupled to switch control. The information bearing signal may be provided to a decoder based on the value of the switch control signal.

Figure 4B:
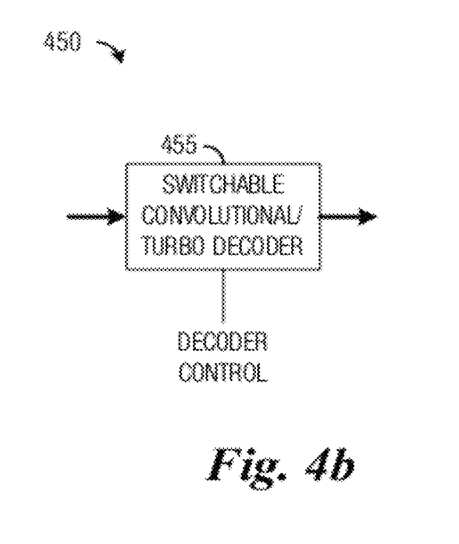
FIG. 4b is a diagram of a detailed view of a second APP decoder unit.

FIG. 4b illustrates a detailed view of a second APP decoder unit 450. As an alternative to a parallel decoder configuration shown in first APP decoder unit 400, second APP decoder unit 450 makes use of a single decoder (switchable convolutional/turbo decoder 455) that may switch between convolutional decoding and turbo decoding operation depending on a value of a decoder control signal on decoder control. According to an embodiment, a typical turbo decoder includes two component decoders, which may be convolutional decoders. Therefore, the inclusion of configurable switches to re-route signal paths, the typical turbo decoder may be able to switch between convolutional decoding and turbo decoding operation depending on the decoder control signal.

As an example, switchable convolutional/turbo decoder 455 may be implemented as a parallel concatenated turbo decoder and when set to operate in convolutional decoding mode, switchable convolutional/turbo decoder 455 may simply turn off iterative turbo decoding.

Figure 5A:
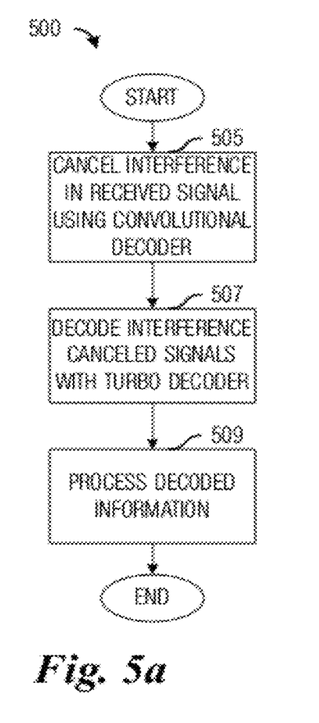
FIG. 5a is a flow diagram of receiver operations in processing received signals.

FIG. 5a illustrates a flow diagram of receiver operations 500 in processing received signals. Receiver operations 500 may be indicative of operations occurring in a receiver with iterative equalization, such as receiver 300, to help improve interference cancellation performance. Receiver operations 500 may occur while the receiver is in a normal operating mode.

Receiver operations 500 may begin when the receiver begins an interference cancellation iteration, which it may perform periodically, when it receives instruction to do so, or when a performance metric, such as bit rate, bit error rate, frame error rate, packet error rate, or so on, exceeds a threshold. The receiver may enter a first phase of interference cancellation iteration wherein it cancels interference present in the information bearing signal using soft information, e.g., soft symbols, generated based on information provided by a component decoder, such as a convolutional decoder (block 505). According to an embodiment, while operating in the first phase of interference cancellation iteration, a first decoding technique may be used. Output of the convolutional decoder, which may be an individual convolutional decoder or a combination turbo and convolutional decoder, may be used to generate soft symbols that may be used to eliminate or reduce interference in the information bearing signal.

The first phase of interference cancellation iteration may compute an interference value present in the information bearing signal that may be used to cancel interference in the information bearing signal in a second phase of interference cancellation iteration. In other words, the first phase may be used to determine the interference value that may be used during the second phase to eliminate or reduce interference present in the information bearing signal.

According to an embodiment, the first phase of the interference cancellation iteration may last for a typically small number of iterations. For example, the first phase may last for a specified number of iterations, with an exact number of iterations potentially being computed on a case-by-case basis. Alternatively, the first phase may continue until an initial convergence is achieved, for example, by detecting an onset of a turbo cliff as shown in FIG. 2.

Once the receiver determines that the end of the first phase is reached, either by counting a number of iterations or detecting that the initial convergence is achieved, the receiver may enter a second phase of the interference cancellation iteration, wherein the full decoder, such as a turbo decoder is used to decode the information bearing signal to determine the information contained in the information bearing signal (block 507). According to an embodiment, the information bearing signal may continue to have interference removed by an interference canceller, such as interference canceller 315, while the receiver is operating in the second phase. The interference canceller may or may not continue to receive updated information to keep its interference cancellation information up to date.

The second phase of the interference cancellation iteration may continue until another interference cancellation iteration begins. While the receiver is in the second phase of interference cancellation iteration, the receiver is producing information that may be used to control the operation of the receiver, control the operation of the electronic device coupled to the receiver, stored for subsequent use, provided to a user of the electronic device coupled to receiver (e.g., music, videos, photos, text, data, applications, etc.), or so forth (block 509). According to an embodiment, the second phase of interference cancellation iteration may make use of a second decoding technique that may be different from the first interference decoding technique used in the first phase of interference cancellation iteration. Alternatively, the second decoding technique may be an extension to the first decoding technique. Receiver operations 500 may then terminate.

Figure 5B:
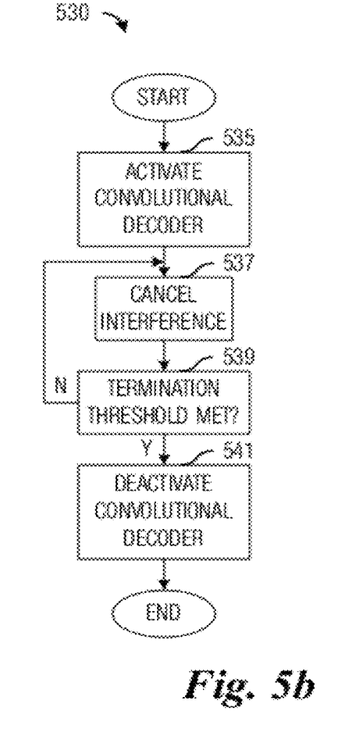
FIG. 5b is a flow diagram of receiver operations in a first phase of an interference cancellation iteration and signal decoding.

FIG. 5b illustrates a flow diagram of receiver operations 530 in a first phase of an interference cancellation iteration and signal decoding. Receiver operations 530 may be indicative of operations taking place in a receiver with iterative equalization, such as receiver 300, to help improve interference cancellation performance. Receiver operations 530 may occur while the receiver is in a normal operating mode. Receiver operations 530 may be an embodiment of block 505 of FIG. 5a, cancelling interference in received signal using convolutional decoder.

Receiver operations 530 may begin with the receiver placing itself into the first phase of the interference cancellation iteration (block 535). According to an embodiment, the receiver may automatically place itself into the first phase each time an interference cancellation iteration occurs.

According to an embodiment, entering the first phase of the interference cancellation iteration may include the receiver selecting that a convolutional decoder be used to decode an information bearing signal that is being received by the receiver. The receiver may select that the convolutional decoder be used if both a convolutional decoder and a turbo decoder are available for use. Alternatively, if a single combination turbo and convolutional decoder is available, then the receiver may select that the combination turbo and convolutional decoder operate in convolutional decoding mode.

While operating in the first phase of the interference cancellation iteration, a component decoder of the full decoder, such as a convolutional decoder, may provide soft information, such as, soft symbols, that may be used by an interference canceller to eliminate or reduce interference present in the information bearing signal (block 537). According to an embodiment, the information bearing signal may have been encoded by at least two codes, e.g., convolutional codes, and the soft information may be generated from the application of one of the at least two codes on the information bearing signal. According to another embodiment, the information bearing signal may have been encoded by at least two codes, e.g., convolutional codes, and the soft information may be generated from every n-th instance of an i-th code, where n is a positive integer value and i is a positive integer value ranging from one and a total number of codes.

According to yet another embodiment, the information bearing signal may have been encoded by at least two codes, e.g., convolutional codes, applied sequentially, and the soft information may be generated from the application of a last applied code of the sequentially applied codes, i.e., an outer most code.

The first phase of the interference cancellation iteration may continue until a termination threshold is met (block 539). According to an embodiment, the termination threshold may be an iteration count or an initial convergence that is detected.

Once the termination threshold is met, the receiver may exit the first phase of the interference cancellation iteration, which may include deactivating the convolutional decoder (block 541). Receiver operations 530 may then terminated.

Figure 5C:
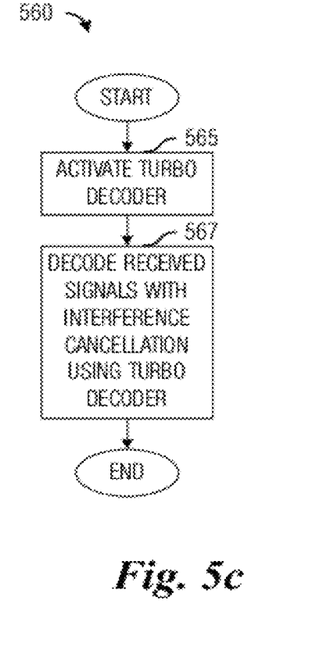
FIG. 5c is a flow diagram of receiver operations in a second phase of an interference cancellation iteration and signal decoding.

FIG. 5c illustrates a flow diagram of receiver operations 560 in a second phase of an interference cancellation iteration and signal decoding. Receiver operations 560 may be indicative of operations taking place in a receiver with iterative equalization, such as receiver 300, to help improve interference cancellation performance. Receiver operations 560 may occur while the receiver is in a normal operating mode. Receiver operations 560 may be an embodiment of block 507 of FIG. 5a, decoding interference cancelled signals with turbo decoder.

Receiver operations 560 may begin with the receiver placing itself into the second phase of the interference cancellation iteration (block 565). According to an embodiment, the receiver may automatically place itself into the second phase each time the receiver exits the first phase of an interference cancellation iteration.

According to an embodiment, entering the second phase of the interference cancellation iteration may include the receiver selecting that a turbo decoder be used to decode an information bearing signal that is being received by the receiver. The receiver may select that the turbo decoder be used if both a convolutional decoder and a turbo decoder are available for use. Alternatively, if a single combination turbo and convolutional decoder is available, then the receiver may select that the combination turbo and convolutional decoder operate in turbo decoding mode.

While operating in the second phase of the interference cancellation iteration, the turbo decoder may provide information extracted from the information bearing signal to hardware coupled to the receiver (block 567). The information may be decoded from the information bearing signal and may be error corrected if needed.

The second phase of the interference cancellation iteration may continue for a duration of the interference cancellation iteration. Once the interference cancellation iteration completes receiver operations 560 may then terminate.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A receiver comprising:
    an interference cancellation unit configured to be coupled to an input port and to iteratively reduce interference in a signal provided by the input port in accordance with estimates of information in the signal, wherein the signal includes a single string of data;
    a matched filtering unit coupled to the interference cancelation unit, the matched filtering unit configured to obtain a correlation of a previously received single string of data with the single string of data;
    a de-interleaver coupled to the matched filtering unit, the de-interleaver configured to remove an interleaving of information contained in the single string of data;
    an a posteriori probability (APP) decoder coupled to the de-interleaver, the APP decoder configured to iteratively decode the single string of data over a plurality of iterations, wherein iteratively decoding the single string of data over the plurality of iterations comprises using a convolutional decoding technique to decode the single string of data during some iterations in the plurality of iterations and using a turbo decoding technique to decode the single string of data during other iterations in the plurality of iterations, wherein the APP decoder is further configured to switch from the convolutional decoding technique to the turbo decoding technique once a termination threshold is met;
    a re-interleaver coupled to the APP decoder, the re-interleaver configured to re-interleave information contained in an output signal of the APP decoder; and
    a soft symbols generate unit coupled to the re-interleaver, the soft symbols generate unit configured to generate estimates of information in the single string of data, wherein the receiver is configured to communicate in accordance with at least one of a third generation partnership project (3GPP) long term evolution (LTE) system, a 3GPP LTE advanced (LTE-A) system, and a Worldwide Interoperability for Microwave Access (WiMAX) system.

2. The receiver of claim 1, wherein the APP decoder comprises a parallel concatenated turbo decoder that is configured to operate during at least some iterations without utilizing turbo decoding.

3. The receiver of claim 1, wherein the APP decoder is configured to use the convolutional decoding technique to decode the single string of data during a first set of iterations, and wherein the APP decoder is configured to use the turbo decoding technique to decode the single string of data during a second set of iterations.

4. The receiver of claim 3, wherein the first set of iterations and the second set of iterations are mutually exclusive.

5. The receiver of claim 3, wherein the first set of iterations comprise odd iterations, and wherein the second set of iterations comprise even iterations, or vice versa.

6. The receiver of claim 1, wherein the termination threshold comprises an iteration count threshold, and wherein the APP decoder is configured to switch from the convolutional decoding technique to the turbo decoding technique when a number of iterations performed exceeds the iteration count threshold.

7. The receiver of claim 1, wherein the termination threshold comprises an error rate threshold, and wherein the APP decoder is configured to switch from the convolutional decoding technique to the turbo decoding technique when an error rate associated with the single string of data exceeds the error rate threshold.

8. A method comprising:
    receiving a signal over an input port, wherein the signal includes a single string of data;
    obtaining a correlation of a previously received single string of data with the single string of data;
    removing an interleaving of information contained in the single string of data;
    iteratively decoding, by a receiver, the single string of data over a plurality of iterations by an a posteriori probability (APP) decoder, wherein iteratively decoding the single string of data over the plurality of iterations comprises using a convolutional decoding technique to decode the single string of data during some iterations in the plurality of iterations, using a turbo decoding technique to decode the single string of data during other iterations in the plurality of iterations, and switching from the convolutional decoding technique to the turbo decoding technique once a termination threshold is met;
    re-interleaving information contained in an output signal produced from the decoding of the single string of data;
    generating estimates of information in the single string of data; and
    performing interference cancellation on the single string of data in between the convolutional decoding technique and the turbo decoding technique, wherein the receiver is configured to communicate in accordance with at least one of a third generation partnership project (3GPP) long term evolution (LTE) system, a 3GPP LTE advanced (LTE-A) system, and a Worldwide Interoperability for Microwave Access (WiMAX) system.

9. The method of claim 8, wherein performing interference cancellation on the single string of data includes:
performing interference cancellation in accordance with soft information generated from decoding the single string of data in accordance with the convolutional decoding technique.

10. The method of claim 8, wherein iteratively decoding the single string of data further comprises:
decoding the single string of data in accordance with the convolutional decoding technique during a first set of iterations; and
decoding the single string of data in accordance with the turbo decoding technique during a second set of iterations.

11. The method of claim 10, wherein the first set of iterations and the second set of iterations are mutually exclusive.

12. The method of claim 10, wherein the first set of iterations comprise odd iterations, and wherein the second set of iterations comprise even iterations, or vice versa.

13. The method of claim 8, wherein the termination threshold comprises an iteration count threshold, and wherein iteratively decoding the single string of data comprises switching from the convolutional decoding technique to the turbo decoding technique when a number of iterations performed exceeds the iteration count threshold.

14. The method of claim 8, wherein the termination threshold comprises an error rate threshold, and wherein iteratively decoding the single string of data comprises switching from the convolutional decoding technique to the turbo decoding technique when an error rate associated with the single string of data exceeds the error rate threshold.

15. A receiver comprising:
a processor; and
a non-transitory computer readable storage medium storing programming for execution by the processor, the programming including instructions to:
receive a signal over an input port, wherein the signal includes a single string of data;
obtain a correlation of a previously received single string of data with the single string of data;
remove an interleaving of information contained in the single string of data;
iteratively decode the single string of data over a plurality of iterations by an a posteriori probability (APP) decoder, wherein the instructions to iteratively decode the single string of data over the plurality of iterations include instructions to use a convolutional decoding technique to decode the single string of data during some iterations in the plurality of iterations, to use a turbo decoding technique to decode the single string of data during other iterations in the plurality of iterations, and to switch from the convolutional decoding technique to the turbo decoding technique once a termination threshold is met;
re-interleave information contained in an output signal produced from the decoding of the single string of data;
generate estimates of information in the single string of data; and
perform interference cancellation on the single string of data in between the convolutional decoding technique and the turbo decoding technique, wherein the receiver is configured to communicate in accordance with at least one of a third generation partnership project (3GPP) long term evolution (LTE) system, a 3GPP LTE advanced (LTE-A) system, and a Worldwide Interoperability for Microwave Access (WiMAX) system.

16. The receiver of claim 15, wherein the instructions to perform interference cancellation on the single string of data include instructions to:
perform interference cancellation in accordance with soft information generated from decoding the single string of data in accordance with the convolutional decoding technique.

17. The receiver of claim 15, wherein the instructions to iteratively decode the single string of data include instructions to:
decode the single string of data in accordance with the convolutional decoding technique during a first set of iterations; and
decode the single string of data in accordance with the turbo decoding technique during a second set of iterations.

18. The receiver of claim 17, wherein the first set of iterations and the second set of iterations are mutually exclusive.

19. The receiver of claim 17, wherein the first set of iterations comprise odd iterations, and wherein the second set of iterations comprise even iterations, or vice versa.

20. The receiver of claim 15, wherein the termination threshold comprises an iteration count threshold, and wherein the instructions to iteratively decode the single string of data include instructions to switch from the convolutional decoding technique to the turbo decoding technique when a number of iterations performed exceeds the iteration count threshold.

21. The receiver of claim 15, wherein the termination threshold comprises an error rate threshold, and wherein the instructions to iteratively decode the single string of data include instructions to switch from the convolutional decoding technique to the turbo decoding technique when an error rate associated with the single string of data exceeds the error rate threshold.

* * * * *